United States Patent Office 3,790,541
Patented Feb. 5, 1974

3,790,541
ETHYLENE-VINYL AROMATIC TELOMER WAXES
AND PROCESSES OF PREPARING THEM
Arthur W. Langer, Jr., Plainfield, N.J., assignor to Esso
Research and Engineering Company
No Drawing. Continuation-in-part of application Ser. No.
85,781, Oct. 30, 1970. This application Oct. 12, 1971,
Ser. No. 188,476
The portion of the term of the patent subsequent to
Oct. 2, 1990, has been disclaimed
Int. Cl. C08f 1/76, 19/04
U.S. Cl. 260—88.2 C                    9 Claims

ABSTRACT OF THE DISCLOSURE

Novel wax compositions containing alkyl cycloalkyl structures in addition to alkyl aromatic telomer structures and also including copolymer telomer structures. These wax compositions have a molecular weight ranging from 500 to 5000.

---

This application is a continuation-in-part of U.S. Ser. No. 85,781 filed Oct. 30, 1970 entitled "Synthetic Wax Process" in the name of Arthur W. Langer, Jr.

This invention relates to a synthetic wax process. In one aspect, this invention relates to reacting ethylene in the presence of a chelated lithium (LiR) catalyst with an aromatic or hydrocarbyl substituted aromatic compound in the presence of an inert saturated hydrocarbon solvent. In another aspect, this invention relates to a process in which the reaction conditions are selected to optimize activity of the catalyst as well as its selectivity towards the production of a wax having a molecular weight ranging between 500 and 5000. In yet another aspect, this invention relates to novel wax compositions containing ethylene telomers which have both naphthenic and aromatic end groups.

In an earlier patent application, which has issued as Pat. No. 3,458,586, a process is described therein for making synthetic waxes at low rates or selectivities. In this process, alkyl aromatic compounds are prepared by reacting an aromatic compound with ethylene at temperatures of 40 to 180° C. and pressures of at least 400 p.s.i.g. in the presence of a catalyst system which is a combination of a nonaromatic ditertiary amine with a lithium hydrocarbon. Each molecule of the wax contains an aromatic end group as a result of an anionic change transfer with the aromatic solvent.

In addition, Eberhardt and Davis have disclosed in Journal of Polymer Science 3, 3473 (1965) that by employing the same catalyst system in the presence of a paraffinic solvent they were able to obtain olefins as the final product.

Pat. No. 3,290,277, issued to William S. Anderson and Stephen H. Levin, assigned to Shell Oil Company, teaches the preparation of new and novel amine-containing copolymers of alkyl styrene and ethylene wherein the monomers are copolymerized in the presence of an organolithium catalyst and a nonchelating tertiary amine which functions not only as a solvent and a cocatalyst, but also as a reactant.

A second Shell patent, U.S. 3,290,414, issued to William S. Anderson, relates to new and novel block copolymers of alpha alkyl styrene and ethylene which are prepared by copolymerizing an alpha $C_1$–$C_5$ alkyl styrene and ethylene in the presence of an oxygen or sulfur containing solvent and an organolithium catalyst at a temperature ranging from −100° C. to 0° C.

The subject invention distinguishes from all of this prior art in that it has now been discovered that novey synthetic waxes can be prepared in high selectivity by using critical reaction conditions which yield the desired molecular weight waxes at high catalyst efficiencies. The catalyst system is similar to that disclosed in Pat. No. 3,458,586; however, the reaction with the aromatic compound is carried out in the presence of a saturated hydrocarbon solvent.

One object of the subject invention is to provide a process for producing synthetic waxes which permits a high yield of the desired molecular weight wax at high catalyst efficiencies.

It is another object of the present invention to provide a process for manufacturing high melting synthetic waxes having number average molecular weights ($\overline{M}n$) ranging from 500 to 5000 which contain substantial amounts of alkyl cycloalkanes in addition to alkyl aromatic telomers and lesser amounts of aralkylcycloalkanes and normal paraffins.

Other objects and many of the attendant advantages of this invention will be readily appreciated as the same becomes better understood by reference to the following detailed description.

Briefly, this invention relates to reacting ethylene with a solvent mixture consisting of either an aromatic compound or a hydrocarbyl substituted aromatic compound, said compound containing up to about 30 carbon atoms and having either aromatic or benzylic hydrogen sites falling within a pKa range between about 32 and 38, and an inert hydrocarbon compound in the presence of a catalyst system comprising an organometal compound such as butyllithium and a bifunctional Lewis base. The percent of aromatic compound in the mixture ranges from as low as 1% to 50% by volume. As the aromatic proportion is increased, product molecular weight decreases and the wax contains a higher proportion of alkyl aromatic molecules. Conversely, as the aromatic proportion is decreased, wax molecular weight increases and the wax contains a higher proportion of alkyl cycloalkane structures.

The proportion of aromatic compound and the type of aromatic compound may be varied to control the wax molecular weight and properties. The amount of aromatic compound determines the reaction temperature at which catalyst activity is sufficient to be commercially attractive to obtain products in the proper molecular weight range. The alkyl naphthene content of the wax is increased by decreasing the present aromatic compound in the feed to range from 1 to 3%. However, because the catalyst activity drops rapidly with decreasing aromatic concentration, it is preferred to operate with at least 3% aromatic in the solvent mixture. Likewise, the naphthene content is decreased by increasing the percent aromatic from 20 to 50% or higher. However, product molecular weight drops rapidly with increasing aromatic concentration and one loses selectivity to wax, so it is preferred to use less than 30% aromatic. Of course, molecular weight could be increased by decreasing reaction temperature but this is unattractive because of loss of activity. Therefore, the preferred aromatic concentrations are in the range of 3 to 30 volume percent in a saturated hydrocarbon solvent.

The aromatic and hydrocarbyl substituted aromatic compounds which can be used contain up to about 30 carbon atoms and have either aromatic or benzylic hydrogens falling within the range of pKa between about 32 and 38 (i.e., ±1 pKa units) based on the MSAD scale (D. J. Cram, "Fundamentals of Carbanion Chemistry," Academic Press, New York, 1965, p. 19). Suitable examples include benzene, toluene, xylene, mesitylene, higher methylated benzenes, such as hexamethylbenzene or durene, ethylbenzene, propylbenzene, higher alkylbenzenes, such as pentadecylbenzene, di-sec-dodecylbenzene or 1,2,4-triisopropylbenzene, cumene, t-butylbenzene, t-butyltoluene, 1,4-diisoamylbenzene, diphenyl, 4,4'-dimethyldiphenyl, diphenylmethane, 1,2 - diphenylethane, tetrahydronaphthalene, methyl and polymethyl naphthalenes, and mixtures thereof, including aromatic concentrates and solutions containing aromatics from refining processes such as aromatization. The term "hydrocarbyl" is to be limited in the subject invention to include only aryl, cycloalkyl and alkyl. In addition, aromatic heterocyclic compounds, such as methylpyridine, 5-methylquinoline, methyldibenzothiophenes, etc. are also useful in this process. In general, increasing the number of methyl groups on the aromatic leads to more facile chain transfer during telomerization and therefore yields lower molecular weight wax. The most preferred aromatics for making waxes in the range 500–5000 $\overline{M}n$ are benzene, toluene, xylenes, and lower alkylbenzenes, and mixtures thereof.

The other constituent of the mixture is the inert hydrocarbon which can be any paraffin, isoparaffin, cycloparaffin, or mixtures thereof. The number of carbons is not critical but will usually be between 3 and 30. Preferably, the boiling point of the hydrocarbon is selected to facilitate separation from the products on recycle. Suitable examples include butane, hexane, heptane, octanes, cyclohexane, methyl cyclohexane, methyl cyclopentane, ethyl cyclopentane, propyl cyclopentane, 1,3-methylheptocosane, saturated naphtha fractions, white oils, etc.

In the preferred embodiment, ethylene alone is polymerized with the foregoing mixture in contact with an organometal-bifunctional Lewis base catalyst system in accordance with the present process. However, it is possible to form copolymer telomers in which the copolymer telomers are made by copolymerization of ethylene and an alpha alkylstyrene in the presence of the above-identified aromatic-hydrocarbon solvent. The alpha alkyl group may be a $C_1$–$C_{20}$ alkyl group preferably a methyl group; i.e., alpha-methylstyrene. The copolymer telomer may contain between about 1% and 50%, preferably about 2 to 20% by weight of the alpha-alkylstyrene to modify properties such as adhesion, elongation, flexibility, compatibility and formulation with other waxes and additives, etc. The alpha-alkylstyrene is preferably incorporated into the copolymer in random fashion since this produces the maximum effect with minimum amount. Other styrene monomers also may be used, especially arylalkylstyrenes.

The novel copolymer telomer waxes possess unique structures which impart improved properties compared to the telomer waxes. The terminal ring structures in combination with the comonomer units in the polymer chain give increased flexibility and toughness while maintaining the desirable properties of the unmodified telomer waxes, i.e., high melting and high congealing points, high tensile strength and low viscosities. These waxes possess superior properties when used alone or in blends in formulations with other natural or synthetic waxes, polymers or additives. The combination of properties is superior to those of the commercial synthetics such as polyethylene wax, ethylene-alpha-olefin copolymer wax, Fischer-Tropsch wax and other ethylene-based copolymer waxes.

The comonomer is a vinyl aromatic which may contain saturated hydrocarbyl substituents on the ring or on the carbon alpha to the ring. Suitable examples include styrene (vinyl benzene); ring-substitute styrene, such as arylmethyl styrene, 3,4-dimethylstyrene, p-t-butyl styrene, dodecyl styrene, eicosylstyrene, p-phenylstyrene and cyclohexylstyrene and the like; vinyl-substituted styrenes such as alpha-methylstyrene, alpha-butylstyrene, alpha-methyl-p-methylstyrene, stilbene, 4,4'-dimethyl-stilbene and the like. The most preferred comonomers include m- and p-alkylstyrenes and alpha-alkylstyrenes, especially the methyl derivatives.

The catalyst system is an organolithium compound in combination with a chelating tertiary diamine. It is evident, however, that the desired aryllithium may be prepared simply by metalating the aromatic prior to its use. This is accomplished by mixing the alkyllithium and the chelating agent in the aromatic solvent for a few minutes up to an hour at ambient temperature according to the following schematic equation:

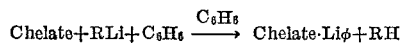

$$\text{Chelate} + \text{RLi} + C_6H_6 \xrightarrow{C_6H_6} \text{Chelate} \cdot \text{Li}\phi + \text{RH}$$

The group RLi can be employed in this equation, wherein R is a monovalent hydrocarbon radical of 1 to 20 carbon atoms, preferably about 1 to 8 carbon atoms. Examples of suitable R groups include alkyl, cycloalkyl, aryl, aralkyl or allyl but it is preferred to use the aryl group corresponding to the aromatic compound used as chain transfer agent in the telomerization. Thus, phenyllithium is preferred with benzene solvent, benzyllithium with toluene solvent, etc.

Specific examples of R groups for substitution in the above formula include methyl, ethyl, n-propyl, isopropyl, n-butyl, isobutyl, t-butyl, n-amyl, isoamyl, n-hexyl, n-octyl, n-decyl, and the like; allyl, 2-butenyl, 2-methyl-2-butenyl and the like; cyclopentylmethyl, cyclohexyl-2-butenyl, cyclopentylethyl, methylcyclopentylethyl and the like; cyclopentyl, cyclohexyl, 2,2,1-bicycloheptyl, and the like; methylcyclopentyl, dimethylcyclopentyl, ethylcyclopentyl, methylcyclohexyl, dimethylcyclohexyl, ethylcyclohexyl, isopropylcyclohexyl, cyclopentadieneyl and the like; phenyl, tolyl, xylyl, ethyl-phenyl, naphthyl, naphthylmethyl, methylnaphthyl, methylethylnaphthyl, cyclohexylphenyl, and the like.

Particularly preferred as the first component of the catalyst system are n-butyllithium, phenyllithium and benzyllithium.

The second component of the catalyst system comprises a bifunctional Lewis base which is one selected from the group consisting of sparteine, N,N'di-($C_1$–$C_4$ alkyl)-bispidins and di(tertiary)-amines having the following general formulas:

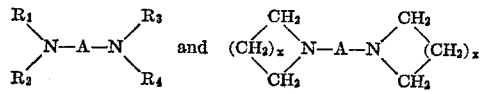

wherein $R_1$, $R_2$, $R_3$ and $R_4$ are the same or different alkyl radicals of 1 to 4 carbon atoms inclusive, A is a nonreactive group an $x$ is an integer of 0 to 3 inclusive.

For the purposes of this invention, A in the above formulas is selected from the group consisting of (1) cycloaliphatic radicals and their lower alkyl derivatives having ring structures containing 5 to 7 members, wherein said radicals are attached to the nitrogen atoms at adjacent positions on the rings; suitable examples include N,N,N',N'-tetramethyl - 1,2 - cyclopentanediamine, N,N, N',N' - tetramethyl - 1,2 - cyclohexanediamine; and (2) 1 to 4 methylenic radicals inclusive, wherein each methylenic radical contains 0 to 2 monovalent hydrocarbon radicals of 1 to 4 carbon atoms; suitable examples include 1,2-dipiperidyl ethane,
N,N'-dimethyl-N,N'-diethyl-1,
2-ethanediamine,
N,N,N',N'-tetramethyl-1,2-pentanediamine,
N,N,N',N'-tetramethyl-1,2-propane-diamine,
N,N,N',N'-tetramethyl-2,
3-butanediamine,
N,N,N',N'-tetramethyl-1,4-butanediamine.

Particularly valuable as the second component of the catalyst system is an organic diamine having the general formula:

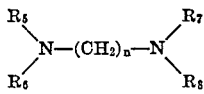

wherein $R_5$, $R_6$, $R_7$ and $R_8$ are the same or different alkyl radicals of 1 to 3 carbon atoms inclusive and $n$ is an integer between 1 and 4 inclusive. In the most preferred structures, $n=2$ or 3. Suitable examples include:

N,N,N',N'-tetramethyl-methanediamine,
N,N-dimethyl-N',N'-diethyl-1,2-ethanediamine,
N,N,N',N'-tetramethyl-1,2-ethanediamine,
N,N,N',N'-tetraethyl-1,2-ethanediamine,
N,N,N',N'-tetraethyl-1,2-ethanediamine,
N,N,N',N'-tetramethyl-1,3-propanediamine,
N,N,N',N'-tetramethyl-1,2-propanediamine,
N,N,N',N'-tetramethyl-1,4-butanediamine, and the like.

In preparing and using this catalyst, all steps in the process should be carried out in the absence of moisture and preferably also in the absence of oxygen or other harmful impurities. This may be readily done by blanketing the materials with an inert gas, such as dry nitrogen or argon. The raw materials, i.e. both the reactants and inert liquids, may be preferably purified or otherwise treated to remove traces of mositure, oxygen, carbon dioxide and other catalyst poisons. It is generally desirable that the monomer stream should contain less than about 200 p.p.m. and the inert liquid less than about 50 p.p.m. by weight of the aforementioned impurities.

In practicing one embodiment of this invention, it is generally desirable to prepare the catalyst system by premixing the selected organometal (i.e. the first component) with the selected bifunctional Lewis base. However, the components may also be mixed in the presence of ethylene. Although a catalyst system comprising one organometal and one bifunctional base is preferred, mixtures of organometals and bifunctional Lewis bases may also be employed.

The molar ratio of the bifunctional Lewis base to the organo metal is from 10:1 to 1:2, preferably between about 5:1 to 1:1:

Reaction temperature ranges from 40° to 150° C., preferably 80 to 120° C. At the lower temperatures, catalyst activity declines normally. Above about 120° C., activity declines as the catalyst decomposition reaction becomes more prevalent. The optimum temperature for maintaining top catalyst efficiency is a range between 80 and 120° C. The reaction is run in the liquid phase.

Although the concentrations of the catalyst components are not critical, sufficient amounts of the aromatic plus the hydrocarbon solvent are preferably employed such that the concentration of the catalyst is normally of the range from 0.01 to 20 grams per liter, preferably 0.1 to 10 grams per liter of solution. It has been found that the catalyst efficiency in this process is optimized with low catalyst concentrations.

As a matter of convenience, the individual catalyst components may be diluted prior to mixing. Standardized solutions of each catalyst component may be employed wherein the concentration of each solution is in the range of 0.1 to 5 N, preferably 0.5 to 2 N.

Although the temperatures required for the catalyst preparation are not critical it is desirable to prepare the catalyst at temperaures ranging from about −50 to 100° C., preferably at temperatures in the range of 0 to 80° C. Since the catalyst components, after mixing, normally result in a liquid mixture, the catalyst can conveniently be prepared at atmospheric pressure. The catalyst components are preferably mixed and stored in the aromatic solvent to be used in the telomerization in order to obtain the desired aryllithium compound.

Ethylene pressure may be between about 500 and 5000 p.s.i. or higher, but is preferably between 800 and 2000 p.s.i. Activity and molecular weight increase with increasing ethylene concentration (pressure), so directionally one favors higher pressures until the costs associated with the high pressure equipment become excessive.

Reaction times range from about one half hour to 7 hours or more. The choice is made to achieve the desired production rate and catalyst efficiency. The preferred times are 1 to 5 hours. The process may be carried out in either batch or continuous operation using stirred tanks, tubular reactors or other conventional equipment. In stirred tank units, cooling may be done by conventional cooling coils, by pump-around heat exchangers or by autorefrigeration using refluxing ethylene. In batch operation, increased catalyst efficiency is obtained by adding all of it initially.

The wax may be recovered by any conventional procedure such as flashing light ends, precipitation, crystallization, extraction, etc. The preferred finishing process is described in the copending patent application filed on Oct. 30, 1970 bearing Ser. No. 85,606, which includes recycle of solvents, light ends and excess chelating agent.

The product from this process has a novel and most unexpected composition. The waxes as well as the low molecular weight products made under the conventional telomerization conditions as described in U.S. Pat. 3,458,586 were entirely linear alkylbenzenes when benzene was used as the reaction solvent. In this process, a large amount of naphthenic product is obtained in addition to some of the expected alkylbenzene product.

Based on analysis of low molecular weight products, the alkyl naphthenes are predominantly alkyl cyclopentanes. However, it was not possible to identify the ring-size in the higher molecular weight products so cyclohexanes and higher ring structures, e.g. cycloheptane or cyclooctane, cannot be excluded.

The compositions are ethylene telomers containing predominantly both naphthenic and aromatic end groups. Their molecular weight ranges from 500 to 5000.

The structure was shown to be naphthenic by intensive analytical studies involving IR, NMR and GC/MS. An olefin structure, which also has $C_nH_{2n}$ formula, was eliminated as a possibility for all products above $C_4$. The proportion of naphthenic product varies inversely with the aromatic concentration in the solvent mixture and may range from about 20 to 90 mole percent or more. Since many natural waxes contain naphthene ring structures, the products of this invention may be considered to be related to natural waxes; however, they are of much higher purity, higher melting, harder, etc., than the natural waxes by virtue of the linearity of the polyethylene chains attached to the ring structures (both naphthenic and aromatic).

The waxes are of very high quality as measured by color, softening point, melting point, molecular weight, molecular weight distribution, hardness, gloss, congealing temperature, etc. They are useful as additives for a wide variety of polymers and wax formulations to impart various desirable properties to the mixtures.

In another embodiment of this invention, olefins or diolefins may be used in place of aromatic compounds as chain transfer agents under similar conditions. The waxes obtained in this case are mixtures of ethylene telomers containing both olefinic and naphthenic end groups. The use of olefins in place of aromatics also leads to high activities and wax selectivities when utilized in similar concentrations and under similar conditions. The olefins preferably contain between about 4 and 30 carbons. Suitable olefins include alpha olefins such as butene-1, pentene-1, hexene-1, dodecene-1, eicosene-1, and the like, internal olefins such as butene-2, octene-3, decene-4 or mixtures of double bond isomers including mixtures obtained from isomerization of alpha olefins, and branched or cyclic olefins, such as isobutylene, 2,3 - dimethylbutene-1, 2,3-dimethyl-butene-2, 2-ethylhexene-1, 2-dodecylhexadecene-1, cyclohexene, cyclooctene, etc. Suitable diolefins include isoprene, 2,3-dimethylbutadiene, piperylene, 2,4-hexadiene, etc.

The following examples are given below to illustrate the preparation of the types of products described hereinabove.

EXAMPLE 1

A 0.5 M solution of $\phi$Li·2TMED in benzene was prepared by aging a 0.5 M BuLi·2TMED solution for 4 days at 25° C. A solution of 3 mmoles $\phi$Li·2TMED in 25 ml. benzene was pressured into the reactor with ethylene. The reactor contained 475 ml. n-heptane at 95° C. and 800 p.s.i.g. ethylene pressure. Reaction conditions of 100° C. and 1000 p.s.i.g. were reached within a few minutes and maintained for 5 hours The total reactor solution was flashed into 1 liter $H_2O$ in a 5 l. flask and gaseous products were vented. The slurry was distilled through a 7 in. Vigreaux column until 500 ml. $H_2O$ was taken overhead in addition to the volatile hydrocarbon solvents and light ends. The wax slurry was dispersed in a Waring Blender, filtered from the water solution of catalyst residues, rinsed with water and vacuum dried at 80–85° C. The yield of wax was 117 g.; $\overline{M}n$ (Number average molecular wt.)=1509; Fisher-Johns softening point=217° F.; Plateau melting point =240.5° F.

EXAMPLE 2

The procedure of Example 1 was followed except that 75 ml. benzene and 425 ml. n-heptane (15 vol. percent benzene) were used instead of 5% benzene. Wax yield =189 g.; softening point=183° F.; melting point =236° F.

EXAMPLE 3

The procedure of Example 1 was followed except that 55 ml. benzene and 450 ml. n-heptane (10.9 vol. percent benzene) were used instead of 5% benzene. Wax yield =211 g.

EXAMPLE 4

The product structures from Examples 1–3 were determined by extensive studies involving gas chromatography, infrared spectroscopy, nuclear magnetic resonance and mass spectroscopy. The waxes were shown to consist predominantly of a mixture of monoalkylbenzenes and alkylnaphthenes. This was unexpected because the prior art had shown that only alkylbenzenes were obtained when an aromatic solvent was used (U.S. 3,458,586) and that olefins were obtained when a paraffinic solvent was used (Eberhardt and Davis, J. Polymer Sci. A., 3, 3753 (1965)).

The results are summarized in the table below.

TABLE I

| Benzene, vol. percent in n-heptane | 5 | 10.9 | 15 |
|---|---|---|---|
| Wax $\overline{M}n$ | 1,509 | 1,357 | 1,249 |
| Alkylbenzenes, mole percent [1] | 40 | 57 | 66 |
| Alkylnaphthenes, mole percent [2] | 60 | 43 | 34 |

[1] Includes aralkylcycloalkanes.
[2] Includes n-paraffins.

The mechanism for formation of alkylnaphthenes may involve formation of transient TMED·LiH or it may require participation of ethylene to produce TMED·LiC$_2$H$_5$ directly.

EXAMPLE 5

The procedure of Example 1 was followed except that several different aromatics were used, the catalysts were prepared by mixing BuLi+TMED in the aromatic for 15–35 min. to obtain the ArLi·TMED, and the products were isolated by precipitation with 1 liter isopropyl alcohol, filtration, recrystallization from 5 volumes alcohol, filtration and vacuum drying at 70° C.

The results summarized in Table II show that a variety of aromatic compounds may be used in this process. In general, increasing the number of methyl groups on the aromatic results in more rapid chain transfer and yields lower molecular weight total products. Secondary and tertiary benzylic hydrogens are succeedingly less reactive and reactivity of the aromatic hydrogens becomes competitive.

TABLE II

| TMED/$\phi$Li, mmoles | 6/6 | 6/6 | 6/6 | 12/6 |
|---|---|---|---|---|
| Aromatic | Benzene | Toluene | Xylene | Tetralin |
| Vol percent in n-heptane | 20 | 20 | 5 | 10 |
| Temp., ° C | 100 | 100 | 100 | 100 |
| Time, hrs | 5 | 5 | 5 | 5 |
| Wax: | | | | |
| Yield, g. [a] | 115 | 127 | 104 | 198 |
| Selectivity, percent [b] | 90 | 82 | 92 | 92 |
| $\overline{M}n$ | 1,247 | 1,018 | 1,490 | 1,799 |

[a] Product $>C_{36-40}$.
[b] Excludes volatiles lost during drying light ends.

EXAMPLE 6

The procedure of Example 5 was followed except that temperature was varied while holding the percent xylene constant.

TABLE III (6 mmoles $\phi$Li·TMED; 5 vol. percent xylene in n-C$_7$: 1,000 p.s.i.g.; 5 hrs.)

| Temp., ° C | 80 | 100 | 120 |
|---|---|---|---|
| Wax: | | | |
| Yield, g | 69 | 104 | 47 |
| Selectivity, percent | 93 | 92 | 76 |
| $\overline{M}n$ | 2,127 | 1,490 | 1,126 |

The results show that activity is optimum at about 100° C. The decrease in activity above 100° C. is due to catalyst decomposition, whereas the decrease below 100° C. is the normal temperature effect on reaction rate. Wax molecular weight decreases rapidly with increasing temperature. Therefore, temperature is an effective variable for controlling molecular weight, in addition to the aromatic concentration (Table I).

EXAMPLE 7

The procedure of Example 6 was followed except that both temperature and benzene concentration were varied.

TABLE IV (6 mmoles $\phi$Li·TMED; benzene in n-C$_7$; 1,000 p.s.i.g.; 5 hrs.)

| Benzene, vol. percent | 5 | 10 | 20 |
|---|---|---|---|
| Temp., ° C | 120 | 100 | 80 |
| Wax: | | | |
| Yield, g | 41 | 107 | 49 |
| Selectivity, percent | 83 | 95 | 96 |
| $\overline{M}n$ | 1,334 | 1,552 | 1,969 |

These results show that a change of 40° C. in polymerization temperature has a greater effect than a fourfold change in benzene concentration on the wax molecular weight. The increased benzene concentration should have decreased molecular weight but the opposing effect of decreased temperature prevailed. Also, as shown previously in Example 6, the maximum wax yield was obtained at 100° C.

EXAMPLE 8

The procedure of Example 3 was followed except that ethylene pressure was varied while holding other variables constant.

TABLE V (3 mmoles $\phi$Li·2TMED; 10.9% C$_6$H$_6$ in n-C$_7$; 100° C.; 5 hrs.)

| C$_2$H$_4$, p.s.i.g | 850 | 950 | 1,050 |
|---|---|---|---|
| Wax: | | | |
| Yield, g | 172 | 188 | 205 |
| $\overline{M}n$ | 1,320 | 1,297 | 1,390 |
| Soft. point, ° F | 163 | 192 | 208 |
| Melting point, ° F | 237 | 238 | 239 |

The wax yield increased almost linearly with increasing ethylene pressure, showing that higher activities and higher catalyst efficiencies may be obtained by further increases in pressure. However, these are compensated by higher costs for pressure equipment which allows one to calculate the economic optimum. There should be a small increase in molecular weight with increasing pressure, but small variations in the amount of light ends present were more important.

EXAMPLE 9

The procedure of Example 3 was followed except that the ratio of TMED/$\phi$Li was varied.

TABLE VI (10.5–10.9% $C_6H_6$ in n-$C_7$; 100° C.; 1,000 p.s.i.g.; 5 hrs.)

| TMED/$\phi$Li mole ratio | 3/3 | 6/3 | 9/3 |
|---|---|---|---|
| Wax: | | | |
| Yield, g | 60 | 195 | 219 |
| $\overline{M}n$ | 1,413 | 1,355 | 1,308 |

The yield increased with increasing TMED/$\phi$Li ratio, although the sharpest increase occurred between 1/1 and 2/1. The optimum ratio for a once-through operation is about 2/1, whereas about 3/1–4/1 is optimum when TMED is recovered and recycled. Molecular weight decreased with increasing TMED concentration showing that higher polymerization activity and higher chain transfer activity are both associated with the chelate complex which is favored by the mass action effect. These results also show that appreciable dissociation of the chelate must occur under these conditions.

EXAMPLE 10

The procedure of Example 3 was followed except that the catalyst was 2 mmoles $\phi$Li·3TMED and it was added in increments during the reaction rather than all initially. At the start, 1 mmole $\phi$Li·3TMED in 43 ml. benzene was added to the reactor containing 450 ml. n-heptane and 800 p.s.i.g. ethylene at 96.5° C. Pressure and temperature were immediately raised to 100° C. and 1000 p.s.i.g and maintained for 5 hours After each hour for 3 hours, an additional 0.33 mmole $\phi$Li·3TMED in 6 ml. benzene was pressured into the reactor. The reaction mixture was recovered as in Example 1 after a total of 5 hours reaction time based on the first charge of catalyst. In another experiment, 3 mmoles of $\phi$Li·2TMED catalyst was added in increments during the reaction. These results are compared in the table below with experiments in which the total catalyst was charged initially as in Example 3.

TABLE VII

| $\phi$Li/TMED, mmoles | 3/6 | 2/6 | 3/6 | 2/6 |
|---|---|---|---|---|
| Catalyst addition | (¹) | (¹) | Incremental | |
| Initial charge | Total | Total | 1/6 | 1/6 |
| Number of additions | | | 3 | 3 |
| Amount per addition | | | 1/6 | 1/6 |
| Wax yield, g | 209 | 137 | 271 | 248 |
| $\overline{M}n$ | 1,309 | 1,336 | 1,424 | 1,393 |

¹ Regular.

The procedure gave higher yield and catalyst efficiency than the comparable runs made with total catalyst addition at the start, despite the fact that part of the catalyst had only 2–4 hours residence time. This shows that the loss of catalyst activity is concentration dependent and that continuous catalyst addition to maintain the lowest concentration throughout the run will further increase efficiency.

EXAMPLE 11

A run was made in a continuous polymerization unit having 540 ml. liquid volume. The catalyst preparation, polymerization conditions and product recovery were carried out according to the procedure of Example 3. A solution of 3.93 mmolar $\phi$Li·3TMED in 10.9% benzene—89.1% n-heptane was pumped continuously into a stirred reactor maintained at 100° C. and 1000 p.s.i.g. ethylene pressure. The liquid phase reactor product was removed semi-continuously to maintain the liquid volume in the reactor at 540 ml. At a residence time of 2.61 hours, the wax concentration in the reactor product was 28 wt. percent based on benzene plus heptane, and the wax production rate was 1080 g./hr./g. BuLi. The wax $\overline{M}n=1358$.

In other continuous runs, the variables studied included TMED/$\phi$Li mole ratio (2–4), catalyst concentration (3.93–7.87 mmoles $\phi$Li/liter) and residence time (1.5–4 hrs.). Wax concentratons ranging from 24–44 wt. percent were obtained at the various production rates.

EXAMPLE 12

A copolymer telomer was prepared by telomerizing ethylene in the presence of 23.5 g. alpha-methylstyrene (freshly distilled from calcium hydride). The alpha-methylstyrene and 450 ml. n-heptane were charged to the autoclave, the solution was heated to 95° C. while $C_2H_4$ pressure was raised to 800 p.s.i.g., then a solution of 3 mmoles $\phi$Li·2TMEDA in 55 ml. benzene was added and the system was brought rapidly to 100° C. and 1000 p.s.i.g. After one hour, an additional 3 mmoles $\phi$Li·2TMEDA in 6 ml. benzene was added and the reaction was continued an additional 2 hours at 100° C. and 1000 p.s.i.g. The product was isolated as in Example 1, yielding 138.3 g. wax, $\overline{M}n=1414$. The wax had no Plateau melting point, indicating that it was amorphous and therefore random copolymer telomer. NMR analysis showed the presence of 2.20 aromatic rings per molecule, including the phenyl end-groups from the benzene solvent.

EXAMPLE 13

The procedure of Example 12 was followed except that only 6.0 g. alpha-methylstyrene was charged. The yield of wax—218.8 g.; $\overline{M}n=1285$; Plateau M.P.=234.5° F.

EXAMPLE 14

The procedure of Example 12 was followed except that 32.05 g. t-butylstyrene (freshly distilled from calcium hydried) was used. The wax yield was 289.9 g.; $\overline{M}n=1461$; Plateau M.P.=238° F. The melt was cloudy at 250° F. indicating some incompatibility due to block structure or the presence of some homopolymer.

EXAMPLE 15

The procedure of Example 12 was followed except that 20.8 g. freshly distilled styrene was used and no additional catalyst was added after the initial charge of 3 mmoles $\phi$Li·2TMEDA. Wax yield=173.7 g.; $\overline{M}n=1426$; Plateau M.P.=237.5° F. The melt was cloudy as in Example 14.

EXAMPLE 16

A copolymer telomer was prepared by feeding 50 ml. of a heptane solution containing 10 g. alpha-methylstyrene to the reactor during 4.5 hrs. at 100° C. and 1000 p.s.i.g. $C_2H_4$ pressure. At the start, the reactor contained 450 ml. n-heptane and 41 ml. benzene plus 1 mmole $\phi$Li·3TMEDA After hours 1, 2, 3 and 4, an additional 0.5 mmole $\phi$Li·3TMEDA in 5 ml. benzene was added. After 5 hours reaction time, the product was pressured from the reactor and recovered as in Example 1. Yield: 117.7 g.; $\overline{M}n=1260$; Plateau M.P.=224° F.; Brookfield viscosity =53.7 cps. at 275° F. and 41.0 cps. at 300° F. NMR analysis showed 0.79 aromatic rings per molecule including the terminal phenyl groups from chain transfer to benzene solvent. Homotelomer contains only about 0.5 aromatic right per molecule under these conditions. Therefore, the copolymer telomer contains about one alpha-methylstyrene for every 3-4 telomer molecules.

EXAMPLE 17

The procedure of Example 16 was followed except that 20 g. freshly distilled arylmethylstyrene was used. Wax yield=132.8 g.; $\overline{M}n$=1518; Plateau M.P.=235° F.; Brookfield viscosity=85 cps. at 275° F. and 64.5 cps. at 300° F. NMR analysis found 1.89 aromatic rings per molecule, including phenyl end-groups from the benzene solvent.

EXAMPLE 18

The procedure of Example 12 was followed except that 10 g. arylmethylstyrene was used. Wax yield=277 g.; $\overline{M}n$=1455; Plateau M.P.=238° F. NMR analysis found 0.99 aromatic rings per molecule.

EXAMPLE 19

The procedure of Example 16 was followed except that reaction temperature was 110° C. and 1 mmole $\phi$Li·3TMEDA catalyst was added hours 1, 2, 3 and 4, making the total catalyst charge=5$\phi$Li·3TMEDA. Yield: 144.8 g.; $\overline{M}n$=1016; Plateau M.P.=222° F.; NMR analysis=0.79 aromatic rings/molecules.

EXAMPLE 20

The procedure of Example 12 is followed except that 0.1 mole stilbene is used. The copolymer telomer wax contains stilbene incorporated in the chain.

EXAMPLE 21

These waxes have been found to be very useful as insulating materials in the manufacture of electric power cables to improve the breakdown voltage thereof. These advantages are achieved by the fact that this wax is a solid at room temperature and possesses a melting point near or above 200° F. However, in spite of its high melting point, this wax can act as a diluent in place of extruder oil while imparting at the same time, a better dielectric strength to the finished cable without adversely affecting other physical properties. These advantages are demonstrated in the following table.

on the carbon atoms on the ring or on the carbon atom alpha to the ring containing from 20 to 90 mol percent of naphthenic end groups with the balance being predominantly aromatic end groups.

2. A wax according to claim 1 wherein the styrene derivative constituent is t-butylstyrene.

3. A wax according to claim 1 wherein the styrene derivative constituent is alpha-methylstyrene.

4. A wax according to claim 1 wherein the styrene derivative constituent is arylmethylstyrene.

5. A process for making synthetic waxes having a number average molecular weight ranging from 500 to 5000, said process comprising the step of copolymerizing ethylene with either styrene or a substituted derivative thereof wherein the substituents are saturated hydrocarbyl groups located either on the carbon atoms on the ring or on the carbon atom alpha to the ring in a solvent mixture containing from 3 to 30 volume percent aromatic or aromatic substituted with alkyl, cycloalkyl and aryl in a saturated hydrocarbon solvent with a catalyst consisting essentially of RLi where R is a monovalent hydrocarbon radical containing from 1 to 20 carbon atoms and a bifunctional Lewis base which is one selected from the group consisting of sparteine; N,N'-di($C_1$-$C_4$ alkyl)-bispidins and di-(tertiary)amines characterized by the formulae:

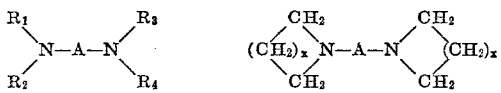

wherein $R_1$-$R_4$ is the same or different and is a $C_1$ to $C_4$ saturated alkyl radical, $x$ is an integer of 0 to 3 inclusive, and A is selected from the group consisting of:

(a) cycloaliphatic radicals and their lower alkyl derivatives having ring structures containing 5 to 7 members, wherein said radicals are attached to the nitrogen atoms at adjacent positions on the rings;

(b) 1 to 4 methylenic radicals inclusive, wherein each radical contains 0 to 2 monovalent hydrocarbon radicals of 1 to 4 carbon atoms under reaction conditions sufficient to maintain the ethylene in the liquid phase.

6. A process as defined in claim 5 wherein the aromatic and aromatic compounds substituted with alkyl, cycloalkyl and aryl are each selected from the group consisting

TABLE VIII

| | 1 | 2 | 3 | 4 | 5 | 6 | 7 | 8 | 9 |
|---|---|---|---|---|---|---|---|---|---|
| Composition in pphr.: | | | | | | | | | |
| Polyethylene | 100 | 100 | 70 | 70 | 30 | 30 | | | |
| Ethylene/propylene copolymer containing 43% by weight ethylene having a molecular weight in the range of 170,000 to 200,000 | | | 30 | 30 | 70 | 70 | 100 | 100 | 100 |
| Alkylbenzene wax | | 10 | | 10 | | 10 | | 10 | 20 |
| Polymerized trimethyldihydroquinoline | 0.5 | 0.5 | 1.0 | 1.0 | 1.0 | 1.0 | 1.0 | 1.0 | 1.0 |
| Treated calcined clay | | | | | 110 | 110 | 110 | 110 | 110 |
| Trialkylcyanurate | 0.75 | 0.75 | 0.75 | 0.75 | 1 | 1 | 1 | 1 | 1 |
| Dicumyl peroxide | 2.7 | 2.7 | 2.7 | 2.7 | 2.7 | 2.7 | 2.7 | 2.7 | 2.7 |
| Physical properties: | | | | | | | | | |
| Shore A hardness | 96 | 97 | 88 | 92 | 84 | 88 | 66 | 73 | 74 |
| 100% modulus | 1,100 | 1,250 | 950 | 820 | 1,150 | 900 | 400 | 460 | 450 |
| Percent elongation | 400 | 410 | 200 | 470 | 280 | 210 | 280 | 260 | 320 |
| Tensile strength | 2,200 | 2,100 | 1,300 | 1,480 | 1,505 | 1,250 | 1,050 | 1,050 | 950 |
| Average thick, mils | 32 | 32 | 31 | 34 | 35 | 33 | 38 | 36 | 34 |
| Dielectric strength,[1] kv./mil | 1.76 | 1.85 | 1.91 | 1.93 | 1.64 | 1.87 | 1.38 | 1.62 | 1.73 |

[1] According to ASTM D149-64, using a rate of rise of 500 v./sec. and 1" electrodes. All samples were prepared in the same manner in a Banbury Blender and cured for 20 min. at 320° F.

The dielectric strength result indicates a definite advantage for these samples containing the alkylbenzene wax, i.e., samples 2, 4, 6, 8 and 9.

The advantage derived from the use of alkylbenzene wax is further enhanced by the fact that this wax is a solid at room temperature and a melting point near or above 200° F.

What is claimed is:

1. A synthetic wax having a number average molecular weight ranging from 500 to 5000, said wax being characterized in that it comprises a copolymer of ethylene and styrene or substituted derivatives thereof wherein the substituents are saturated hydrocarbyl groups located either of compounds possessing either aromatic or benzylic hydrogens falling within a PKA ranging between about 32 and 38.

7. A process according to claim 5 wherein the aromatic compound used is benzene and the hydrocarbon solvent is n-heptane.

8. A process as defined in claim 5 wherein the bifunctional Lewis base is a di-(tertiary)-amine which is capable of forming 5 to 6-membered chelates with the organolithium compound.

9. A process as defined in claim 5 wherein the RLi is phenyllithium, the aromatic is benzene, the hydrocarbon is n-heptane, the styrene derivative monomer is alpha-methyl styrene and the Lewis base is N,N,N',N'-tetramethyl 1,2-ethane diamine.

References Cited
UNITED STATES PATENTS

| | | | |
|---|---|---|---|
| 3,652,696 | 3/1972 | Honeycutt | 260—94.9 R |
| 3,450,795 | 6/1969 | Langer | 260—94.9 R |
| 3,639,380 | 2/1972 | Screttas | 260—94.9 R |
| 3,115,468 | 12/1963 | Emrick | 260—94.9 R |
| 3,290,277 | 12/1966 | Anderson et al. | 260—88.2 C |
| 3,338,877 | 8/1967 | Anderson | 260—88.2 C |

JOSEPH L. SCHOFER, Primary Examiner

E. J. SMITH, Assistant Examiner

U.S. Cl. X.R.

260—33.6 PQ, 85.3 R, 94.9 R, 668 B, 897 A

UNITED STATES PATENT OFFICE
CERTIFICATE OF CORRECTION

Patent No. 3,790,541      Dated February 5, 1974

Inventor(s) Arthur W. Langer, Jr.

It is certified that error appears in the above-identified patent and that said Letters Patent are hereby corrected as shown below:

Column 1, line 36, "nahthenic" should read -- naphthenic --.
Column 2, line 4, "novey" should read -- novel --.
Column 4, line 56, "an" before "x" should read -- and --.
Column 9, line 55, "1/6" (both) should read -- 1/2 --.

Signed and sealed this 17th day of September 1974.

(SEAL)
Attest:

McCOY M. GIBSON JR.          C. MARSHALL DANN
Attesting Officer           Commissioner of Patents

UNITED STATES PATENT OFFICE
CERTIFICATE OF CORRECTION

Patent No. 3,790,541     Dated February 5, 1974

Inventor(s) Arthur W. Langer, Jr.

It is certified that error appears in the above-identified patent and that said Letters Patent are hereby corrected as shown below:

Column 12, line 64, "PKA" should read -- pKa --.

Signed and sealed this 26th day of November 1974.

(SEAL)
Attest:

McCOY M. GIBSON JR.
Attesting Officer

C. MARSHALL DANN
Commissioner of Patents